April 26, 1932.  H. ERICSSON  1,855,881
GRASS GUARD FOR LAWN MOWERS
Filed Aug. 30, 1930
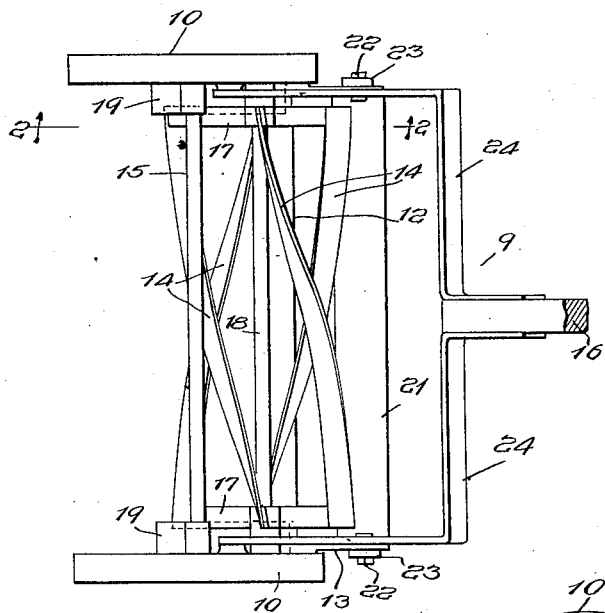
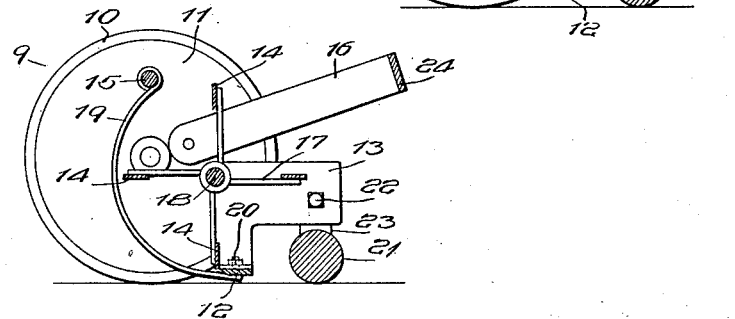
Witness:
William P. Kilroy
Inventor:
Henry Ericsson Patented Apr. 26, 1932

1,855,881

UNITED STATES PATENT OFFICE

HENRY ERICSSON, OF CHICAGO, ILLINOIS

GRASS GUARD FOR LAWN MOWERS

Application filed August 30, 1930. Serial No. 478,860.

My invention relates to lawn mowers and more particularly it relates to a grass guard attachment for lawn mowers.

There is necessarily some clearance space between the ends of the cylindrical blades and the frames or side plates of lawn mowers as at present constructed. In cutting the border of a lawn adjacent to trees, shrubbery, fences or the like, the tall grass which frequently fringes such borders is pulled between the ends of the cylindrical blades and the wheels or side plates and is wrapped about the axis of the cylindrical blade, clogging and tending to stop the same, necessitating the frequent expenditure of time and energy in its removal.

It is an object of the invention to provide a grass guard attachment capable of being mounted on any lawn mower and which is so positioned as to prevent choking or clogging of the lawn mower by grass wrapping about the axis of the cylinder.

Another object of the invention is the provision of a device of the kind described, in combination with a lawn mower, which is simple, durable, efficient and satisfactory for its intended purpose.

Many other objects and advantages of the construction herein described and shown will be obvious to those skilled in the art from the disclosure herein given.

To this end my invention consists in the novel construction, arrangement, and combination of parts herein described and shown and more particularly pointed out in the claims.

Referring now to the drawings forming a part of the specification;

Fig. 1 is a plan view showing the lawn mower having one embodiment of my invention mounted thereon;

Fig. 2 is a section along the line 2—2 of Fig. 1; and

Fig. 3 is a view of another embodiment of my invention.

Referring now more particularly to the drawings, the numeral 9 generally designates any lawn mower of the type having a cylindrical cutter and a pair of driving wheels 10 held in spaced apart relation by a tie rod 15. Side plates or frame members 11 are positioned adjacent the inner face of the wheels 10 to form a housing for gears, not shown and to provide a mounting for the cutter.

The lawn mower is actuated in the usual manner by a handle 16 pivotally connected thereto by a pair of angle bars 24. The cylindrical cutter comprises a plurality of helical blades 14 extending the full length thereof. The cutter rotates about a shaft 18, upon each end of which is mounted a spider 17 to which the blades 14 are connected. A stationary blade 12 is positioned underneath and cooperates with the revolving helical blades 14 to cut the grass. The lawn mower also comprises a roller 21 connected by bolts 22 and standards 23 with a pair of back plates or sections 13.

The clear spaces between the ends of the blades 14 and the side plates or frames 11 are covered by guard plates 19 of such a width that the inner edge overlaps the ends of the blades 14 and the outer edge is in contact with the side plates. In the embodiment shown, the plates 19 are fastened at their upper ends to the tie rod 15 and at their lower ends the plates are fastened to the underside of the stationary blade 12 by countersunk screw bolts 20 or the like. The plates 19 are curved downwardly and rearwardly to prevent any of the grass from entering the clearance spaces so that no clogging or locking of the cylindrical cutter results.

The plates 19 may be mounted on any type of lawn mower by varying the details of its connection. For example in lawn mowers having no tie rod the plates may be flanged and riveted or bolted to the side plates or frames 11.

Fig. 3 illustrates another form of the invention wherein the side plates or frame members 11 have an integrally formed inwardly projecting member 26 overlapping the ends of the cylindrical cutter blades 14. The front face of the member 26 is preferably tapered inwardly and thereby deflects or pushes the long grass inwardly to contact with the cutter blades whereby the grass is severed instead of being mashed down and left in unsevered condition by the lawn mower.

Thus it will be seen that I have provided a grass guard suitable for mounting on lawn mowers, to prevent the grass from wrapping or packing about the bearings of the cylindrical cutter.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. The combination with a lawn mower comprising end frame members, a cylindrical cutter rotatably mounted on said members with a clearance space between the ends of said cutter and said members, a stationary blade underneath said cutter, of an attachment comprising a curved plate encircling the front portion of each of said spaces, the lower end of said plates being fastened to said stationary blade.

2. The combination with a lawn mower comprising end frame members, a cylindrical cutter rotatably mounted in said members, a tie rod connecting said members and positioned above and in front of said cutter, the mounting of said cutter providing a clearance space between its ends and said members, a stationary blade underneath said cutter, of an attachment comprising a plate encircling the front portion of each of said spaces, the upper and lower ends respectively of said plates being directly connected with said tie rod and stationary blade.

In witness whereof, I hereunto subscribe my name this 27th day of August A. D., 1930.

HENRY ERICSSON.